Patented Mar. 20, 1945

2,371,928

UNITED STATES PATENT OFFICE 2,371,928

PROCESS FOR THE PRODUCTION OF POROUS BODIES

Josef Schneider, Oberursel in Taunus, Germany; vested in the Alien Property Custodian No Drawing. Application February 28, 1941, Serial No. 381,191. In Germany January 4, 1940

1 Claim. (Cl. 106—87)

My invention relates to the production of bodies having a vesicular structure, and more particularly to solid porous bodies for building purposes.

Hitherto it was known to produce the cellular structure of solid porous bodies by gas generation in a paste containing hydraulic binders, such as cement, gypsum or the like, and, if desired, also filling materials, e. g., sand, textiles or the like. The gas generation has been accomplished by the addition of gaseous, oxygen evolving compounds like hydrogen peroxide. In order to reduce the cost of the production, hypochlorites were sometimes added which, in the presence of peroxygen compounds, liberated their active oxygen. Instead of hypochlorites, decomposition catalysts, for example compounds of the heavy metals, e. g., manganese sulfate, have also been used. And finally it was also known to stabilize the pores formed by the gas generation of the mixtures, by adding substances which reduced the surface tension such as soap, glue or the like, in order to prevent wasteful escape of the oxygen evolved and to prevent partial reduction of the risen paste.

To obtain satisfactory results in the manufacture of the gas generating mixture it was heretofore necessary to observe a pre-determined order with respect to the addition of the components to the mixture. A paste was made from cement, water, stabilising substances, hydrogen peroxide or other peroxygen compounds, and then if desired, filling materials such as sand and finally introducing an accelerator for the decomposition of the peroxygen compounds, for example, hypochlorite. This procedure succeeded in a slow gas generation which lasted several hours which produced very fine gas bubbles at the beginning. The paste, homogenized during the rising process, was then cast into the molds and, avoiding any percussion, allowed to stand until the gas generation had finished.

Now I have found that the rising of the paste may substantially be accelerated without causing the escape of considerable quantities of the oxygen generated from the paste if the pore stabilising substance is introduced simultaneously with the last added component.

Since cement exerts a stabilising effect on the peroxygen compounds and consequently delays the gas generation process it has proved advantageous for the preparation of light concrete according to my invention, first to mix cement, water, hypochlorite and filling materials after which the pore stabilising substance is added simultaneously with the hydrogen peroxide. Immediately after the preparation of the mixture the gas generation starts and ends in a considerably shorter time than usual. The pores which are formed according to this method are extraordinarily stable and make it possible to finish the gas generation of the mass in the mixing vessels before the mixture is cast into the molds, contrary to the hitherto known methods where it was necessary to cast the paste into the molds as quickly as possible whereby the gas generation was accomplished in the molds. Since it is not necessary to form the mass in the mixing vessels the charges may be considerably enhanced. Moreover, the molds into which the mass, in which the gas generation has already taken place, is cast, may be filled up to the brim since the volume of the mass will not be increased by any subsequent gas generation. In this manner any losses of material will be prevented which hitherto were quite unavoidable because the measure of the last rising could not exactly be foreseen and it was necessary normally to fill the molds so that they contained an excess of material which afterwards was stricken off and cast away.

According to another embodiment of my invention only a part of the generating agent, for instance, hydrogen peroxide, and the pore stabilising agent are finally added to the cement mixture whilst the remaining part of the hydrogen peroxide and, if necessary, also a part of the stabilising agent are added to the mixture of cement, water and filling materials before the accelerator for the decomposition of the hydrogen peroxide, for example, hypochlorite, is introduced. In practicing this method the first part of the hydrogen peroxide which was added before the hypochlorite is introduced, is stabilised by the cement present whilst the second and later added part of the hydrogen peroxide is decomposed and liberates oxygen immediately after the admixture to the paste. Thus very fine bubbles are formed which serve as nuclei for the gas beginning to be generated from the first slowly decomposing part of hydrogen peroxide.

According to my invention it is possible to obtain bodies with either fine or coarse vesicular structure by careful measurement of the quantitative portions of the hydrogen peroxide added in two operation steps. The greater the portion of the first added quantity of hydrogen peroxide, the coarser the pores in the structure of the final product.

Another means for influencing the size of the pores has been found in the selection and quantity of the stabilising substance. For this purpose substances with a reducing effect on the surface tension may be used, for instance, soap, glue, Turkey red oil, tar oils, e. g. wood or coal tar oil of a fraction between 100–300° C. as well as products which are obtained by an alkaline extraction of wood pitch and subsequently concentrated. Really excellent results were obtained in employing saponine and/or, surprisingly enough, with the use of skim milk. If skim milk is used, a very distinct dependence of the size of pores on the quantity of milk added was observed. Reducing the quantity of milk increases the size of the pores. The same laws could be observed in adding saponine and other stabilizers, but not to the same degree as in adding milk. If, for instance, 5 cc. of skim milk are added to a mixture of about 1 kilogram cement and sand which represents an amount of 0.5% milk, a very fine porous structure was obtained whilst an addition of 0.3 to 0.2% of milk increases the size of the pores in a considerable manner. According to my invention it is therefore possible if skim milk is added to the cement mixture, whereby the $H_2O_2$ is introduced in a two step process to obtain well reproducible bodies with a predetermined size of pores. This is, of course, very important in large scale production. A further advantage of the addition of milk and/or saponine is that both components may be well mixed with a solution of hydrogen peroxide. It is therefore expedient to add a solution of saponine in hydrogen peroxide or of a homogeneous mixture of milk and hydrogen peroxide to the pulp and then distribute the added substances in the pulp which warrants that in the place where hydrogen peroxide is decomposed and oxygen evolved, the suitable quantity of the pore stabilizer will be present.

All operation steps described above for cement mixtures are also applicable to other substances, hardening with water, as for instance, gypsum. But since gypsum exerts no stabilising effect on peroxygen compounds, the whole quantity of the gas generating substance, for example, hydrogen peroxide, may be added without any deleterious effect before the decomposition accelerating substances, e. g., manganese sulfate, hypochlorite and the like, are introduced. It is only essential that the pore stabilizer is added at the end of the operation either simultaneously or admixed to one of the substances which participate at the oxygen generation, that is either with the gas generator such as hydrogen peroxide or with a decomposing substance, for instance, hypochlorite or with a decomposing catalyst such as compounds of manganese, iron, nickel, cobalt, or the like.

*Example 1*

375 cc. of a calcium hypochlorite suspension (100 grams hypochlorite with nearly 31% active chlorine, suspended in 150 cc. water) are intimately mixed with 2200 cc. of water, 800 grams of sand (less than 1 mm. mesh) and 3200 grams of Portland cement. To this mixture 90 cc. of a solution containing 50 cc. of a 40% hydrogen peroxide, 4 cc. skim milk and 1.5 grams saponine are added. After a thorough mixing the gas generation starts immediately whereupon the original paste rises to a multiple of its former volume. If the pulp is immediately poured out, a slight increase of the volume will be observed in the mold, whilst no modification of the volume ocurs if the foam is allowed to stand for a quarter of an hour. Porous bodies will then be obtained which correspond accurately to the prescribed form. In this manner bodies with an absolutely uniform porous structure are obtained.

*Example 2*

To a mass of concrete, containing 2200 cc. of water, 3200 grams of Portland cement and 800 grams of fine sand, 5 cc. of a 40% hydrogen peroxide solution with 4.5% saponine are added and the whole mixture vigorously stirred. Then a suspension of 375 cc. of a calcium hypochlorite solution (according to Example 1) and finally 45 cc. of a 40% hydrogen peroxide solution with 4.5% saponine are added and the paste thoroughly mixed.

*Example 3*

To a mass of concrete which contains 210 cc. water, 730 grams sand with a size of 0.3 mm. mesh and 312 grams of Portland cement, 2 cc. of a 40% hydrogen peroxide and 25 cc. of a calcium hypochlorite suspension (including 400 grams of a 30 to 31% active chlorine containing calcium hypochlorite and 600 cc. of water) are intimately homogenized. Thereafter 1.5 cc. of 40% hydrogen peroxide together with 5% skim milk are incorporated simultaneously and the whole pulp thoroughly mixed. During the mixing operation after the addition of the last component the gas generation starts with a considerable increase of volume. The charge is immediately cast into the molds.

*Example 4*

0.8 liters water are intimately mixed with 50 cc. of a sodium hypochlorite solution (11% active chlorine) and 870 grams commercial gypsum added until a homogeneous paste is formed. In this paste 6 cc. hydrogen peroxide (40%) with 0.3 gram saponine are incorporated. It results in the instantaneous development of foam with the formation of very small stable pores. After casting into the molds, articles with an apparent specific gravity of 0.28 are obtained.

*Example 5*

6 cc. of a 40% hydrogen peroxide solution are added to a mass of 800 cc. water and 870 grams gypsum. To this mixture a suspension of 5 grams pyrolusite in 5 cc. of an aqueous solution of 4% saponine is added, the whole mass well homogenized until the gas evolution is practically ended. It results in a very stable froth. The molds may be filled out completely and no further increase of volume will be observed.

*Example 6*

Into a mass of 800 cc. water and 870 grams of gypsum, 6 cc. hydrogen peroxide (40%) are added whilst stirring. Then 1.8 cc. of a solution containing 2 grams of crystallized manganese sulfate in 60 cc. of water and 10 cc. skim milk are incorporated, whereupon 1.7 cc. of a concentrated ammonia solution are added and the whole mass thoroughly stirred. The well homogenized paste is cast into molds whereupon the gas generation starts with an increase of volume. It results in an article with an extraordinarily fine-vesicular structure.

*Example 7*

The same composition as in Example 6 is prepared but with the addition of 5 cc. skim milk only. A solid porous body with a coarse-vesicular structure is obtained.

What I claim is:

The method of controlling the development of gas pores in the production of cellular cementitious bodies which consists in mixing cement, a filler and water with a portion of hydrogen peroxide and of an oxygen stabilizing agent selected from the group consisting of skim milk and saponine, adding the remainder of the required peroxide and stabilizing agent after the initial development of gas and finally adding an alkaline hypochlorite to produce a second development of stabilized gas bubbles smaller than those first produced.

JOSEF SCHNEIDER.